(12) United States Patent
Kess et al.

(10) Patent No.: US 8,742,750 B2
(45) Date of Patent: Jun. 3, 2014

(54) SPEED SENSOR PICK-UP FOR FLUID DEVICE

(75) Inventors: John Ryan Kess, Bloomington, MN (US); John Charles Walters, McPherson, KS (US)

(73) Assignee: Eaton Corporation, Cleveland, OH (US)

( * ) Notice: Subject to any disclaimer, the term of this patent is extended or adjusted under 35 U.S.C. 154(b) by 1755 days.

(21) Appl. No.: 12/138,573

(22) Filed: Jun. 13, 2008

(65) Prior Publication Data
US 2009/0309576 A1 Dec. 17, 2009

(51) Int. Cl.
*G01D 5/14* (2006.01)
*G01P 3/488* (2006.01)
*F04B 1/16* (2006.01)

(52) U.S. Cl.
USPC .......... 324/207.25; 417/22; 417/42; 417/269; 91/499; 73/494; 73/514.31

(58) Field of Classification Search
USPC ......... 123/406.59, 449; 417/22, 42, 269, 270; 324/207.25; 91/472, 499; 73/114.25, 73/115.08, 493, 494, 514.31
See application file for complete search history.

(56) References Cited

U.S. PATENT DOCUMENTS

| | | | | |
|---|---|---|---|---|
| 4,167,895 A * | 9/1979 | Rubinstein | ...................... | 91/506 |
| 4,256,986 A | 3/1981 | Anderson | | |
| 4,561,398 A * | 12/1985 | Roca Nierga | ................. | 123/449 |
| 4,881,414 A * | 11/1989 | Setaka et al. | ............. | 73/862.331 |
| 4,977,882 A * | 12/1990 | Nakamura et al. | ............ | 123/502 |
| 4,989,574 A | 2/1991 | Abe | | |
| 5,046,403 A * | 9/1991 | Riedhammer | ..................... | 92/57 |
| 5,111,098 A | 5/1992 | Peck et al. | | |
| 5,163,818 A * | 11/1992 | Betsill et al. | ..................... | 417/18 |
| 5,504,424 A | 4/1996 | Graf et al. | | |
| 5,729,127 A * | 3/1998 | Tamura et al. | ................ | 324/174 |
| 5,977,764 A * | 11/1999 | Riedle et al. | ................... | 324/165 |
| 6,291,990 B1 * | 9/2001 | Nakane et al. | ........... | 324/207.25 |
| 6,406,271 B1 * | 6/2002 | Valentin | ........................ | 417/269 |
| 6,522,131 B1 * | 2/2003 | Hiligsmann et al. | ........ | 324/207.2 |
| 6,568,311 B2 * | 5/2003 | Widemann | ....................... | 91/484 |
| 6,640,451 B1 * | 11/2003 | Vinarcik | ....................... | 33/1 PT |
| 6,885,186 B2 * | 4/2005 | Wild | .......................... | 324/163 |
| 7,997,879 B2 * | 8/2011 | Bergmann | ..................... | 417/269 |
| 8,333,571 B2 * | 12/2012 | Mehta et al. | ................... | 417/269 |
| 2004/0033144 A1 | 2/2004 | Rush | .............................. | 417/223 |
| 2006/0257268 A1 * | 11/2006 | Reimer | ......................... | 417/269 |
| 2007/0182405 A1 * | 8/2007 | Yokotani et al. | .......... | 324/207.25 |
| 2008/0204007 A1 * | 8/2008 | Kim et al. | ................ | 324/207.25 |
| 2009/0179529 A1 * | 7/2009 | Makino et al. | .............. | 310/68 B |
| 2009/0267593 A1 * | 10/2009 | Goto et al. | ............... | 324/207.25 |
| 2010/0150741 A1 * | 6/2010 | Mehta et al. | .................... | 417/53 |

(Continued)

*Primary Examiner* — Erick Solis
(74) *Attorney, Agent, or Firm* — Merchant & Gould P.C.

(57) ABSTRACT

A speed pick-up ring includes a main body having a plurality of targets and defining a plurality of notches. Each notch is disposed between adjacent targets. Each notch includes a base wall, a first sidewall and an oppositely disposed second sidewall. The base wall includes a convex portion. A fluid device includes a housing and a variable reluctance speed sensor engaged to the housing. The fluid device further includes a speed pick-up ring disposed within the housing. The speed pick-up ring includes a main body having a plurality of targets and defining a plurality of notches. Each notch is disposed between adjacent targets. Each notch includes a base wall, a first sidewall that is generally concave and an oppositely disposed second sidewall that is generally concave. The base wall includes a convex portion.

19 Claims, 7 Drawing Sheets

(56) References Cited

U.S. PATENT DOCUMENTS

2011/0279110 A1* 11/2011 Pieszchala et al. ...... 324/207.25
2012/0126795 A1* 5/2012 Genoud et al. ............. 324/207.2
2012/0262161 A1* 10/2012 Kinashi .................... 324/207.25

* cited by examiner

SPEED SENSOR PICK-UP FOR FLUID DEVICE

BACKGROUND

Variable reluctance sensors are used in various applications. The output from these variable reluctance sensors is used to determine, among other things, the speed of a vehicle or a component on that vehicle. However, the output from these variable reluctance sensors is fluctuations as a result of noise. Therefore, a need exists for reducing or eliminating these fluctuations in the output of variable reluctance sensors.

SUMMARY

An aspect of the present disclosure relates to a speed pick-up ring. The speed pick-up ring includes a main body having a plurality of targets and defining a plurality of notches. Each notch is disposed between adjacent targets. Each notch includes a base wall, a first sidewall and an oppositely disposed second sidewall. The base wall includes a convex portion.

Another aspect of the present disclosure relates to a fluid device. The fluid device includes a housing and a variable reluctance speed sensor engaged to the housing. The fluid device further includes a speed pick-up ring disposed within the housing. The speed pick-up ring includes a main body having a plurality of targets and defining a plurality of notches. Each notch is disposed between adjacent targets. Each notch includes a base wall, a first sidewall that is generally concave and an oppositely disposed second sidewall that is generally concave. The base wall includes a convex portion.

Another aspect of the present disclosure relates to a method of manufacturing a cylinder barrel having an integral speed pick-up ring. The method includes machining a plurality of axially oriented cylinder bores. The method further includes machining a plurality of notches in an outer surface of the cylinder barrel. Each of the plurality of notches is machined such that a base wall of each notch includes a convex portion.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
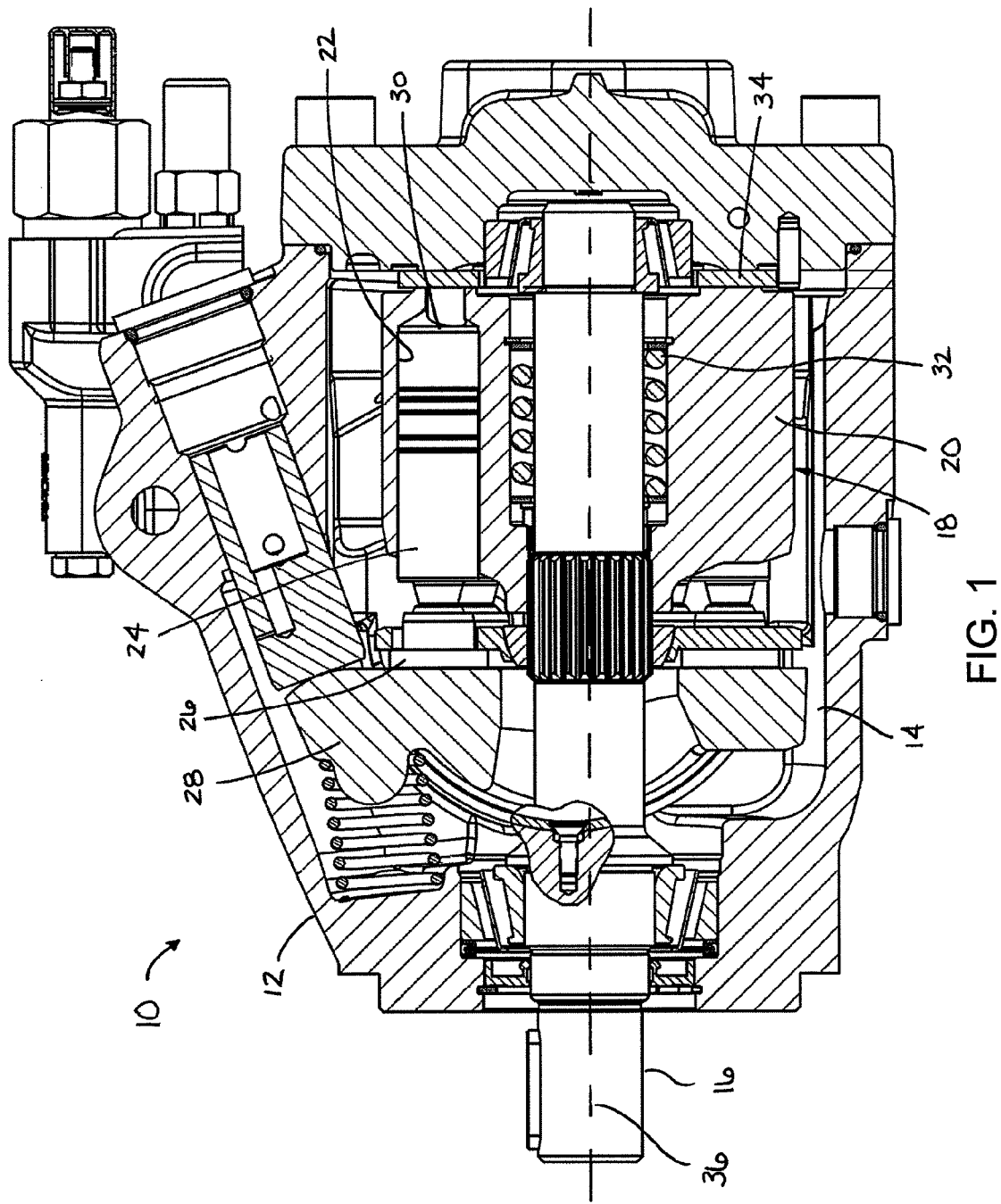
FIG. 1 is a cross-sectional view of a fluid device having features that are examples of aspects in accordance with the principles of the present disclosure.

Referring now to FIG. 1, a fluid device, generally designated 10, is shown. In the depicted embodiment of FIG. 1, the fluid device 10 is shown as an axial piston pump. While the fluid device 10 will be described in reference to an axial piston pump, it will be understood, however, that the scope of the present disclosure is not limited to the fluid device 10 being an axial piston pump as the teachings of the present disclosure could be used with various types of pumps and/or motors, including but not limited to radial piston, cam lobe, gerotor, gear, vane, etc.

The fluid device 10 includes a housing 12 defining a fluid inlet, a fluid outlet and a pumping chamber 14. The fluid device 10 further includes a shaft 16. In the subject embodiment, the shaft 16 extends through nearly the entire axial length of the fluid device 10. The shaft 16 is suitably supported for rotation relative to the housing 12 by various conventional bearing sets.

Disposed within the pumping chamber 14 of the housing 12 is a rotating group, generally designated 18. In the subject embodiment, the rotating group 18 is in fluid communication with the fluid inlet and outlet and in splined engagement with the shaft 16.

The rotating group 18 includes a cylinder barrel 20, which will be described in greater detail subsequently, defining a plurality of axially oriented cylinder bores 22. In the subject embodiment, and by way of example only, there are nine cylinder bores 22 disposed in the cylinder barrel 20. Disposed within each cylinder bore 22 is an axially reciprocal piston 24, which includes a generally spherical head that is pivotally received by a slipper member 26. The slipper members 26 slide along the surface of a stationary swashplate 28. The cylinder bores 22 and the pistons 24 cooperatively define a plurality of volume chambers 30.

In the subject embodiment, the rotating group 18 is biased axially, by means of a spring 32, toward fluid tight engagement with a valve plate 34. The valve plate 34 defines an inlet and an outlet. As the rotating group 18 rotates about a longitudinal axis 36 of the fluid device 10 in response to rotation of the shaft 16, the volume chambers 30 expand and contract. As the volume chambers 30 expand and contract, fluid is passed through the fluid inlet of the housing 12 and into the expanding volume chambers 30 through the inlet in the valve plate 34. Fluid is expelled through the fluid outlet in the housing 12 by the contracting volume chambers 30.

Figure 2:
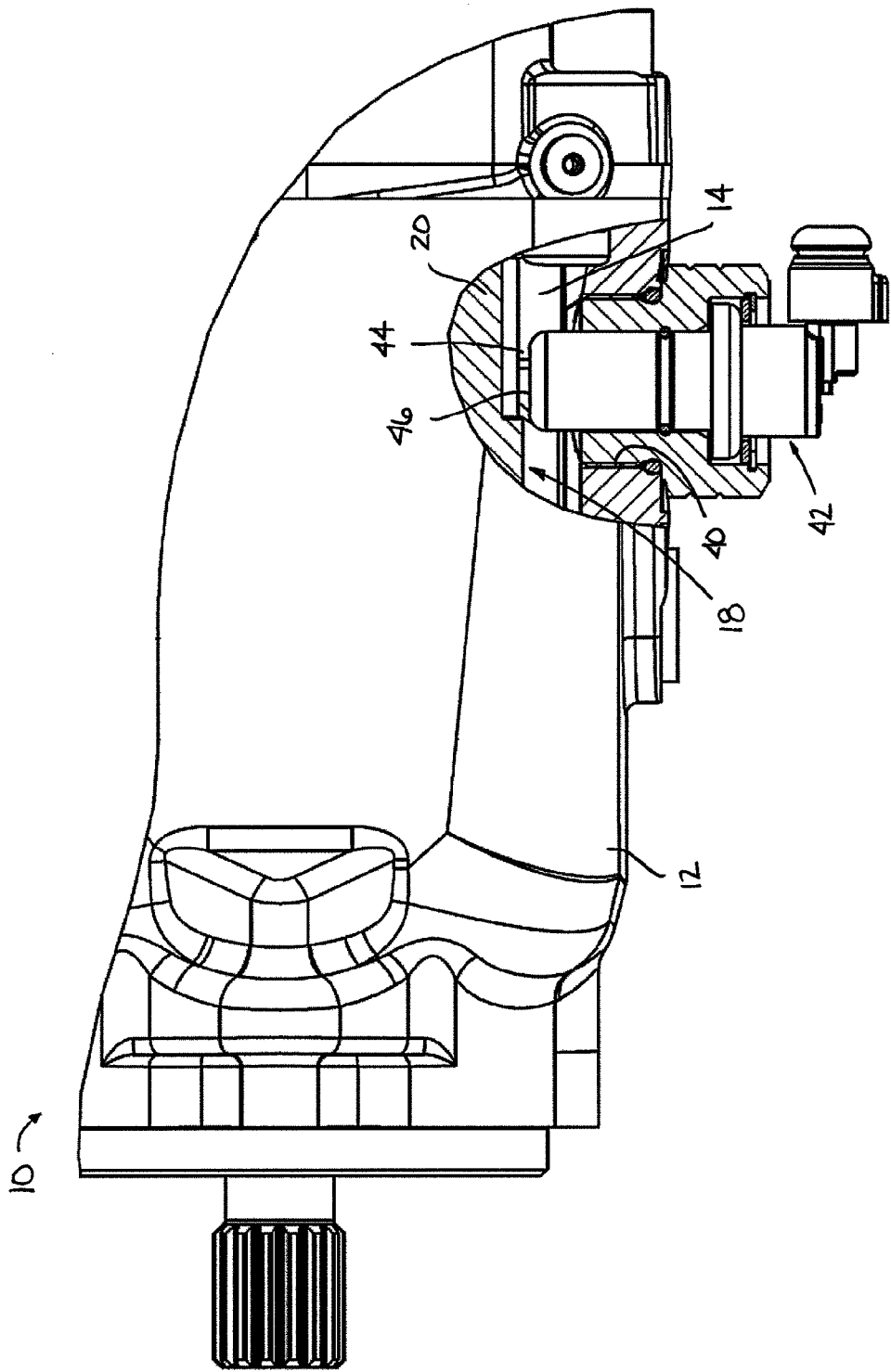
FIG. 2 is a fragmentary view of the fluid device of FIG. 1.

Referring now to FIG. 2, the fluid device 10 defines a sensor port 40. The sensor port 40 defines a passage that is in fluid communication with the pumping chamber 14 and includes a plurality of internal threads. In the subject embodiment, a speed sensor 42 is threadedly engaged with a sensor port 40 in the housing 12.

The sensor port 40 is axially disposed in the housing 12 such that when the speed sensor 42 is installed in the sensor port 40, the speed sensor 42 is positioned proximately to the rotating group 18 in the pumping chamber 14. The speed sensor 42 is positioned in the sensor port 40 such that there is an air gap 44 between an end 46 of the speed sensor 42 and cylinder barrel 20.

Figure 3:
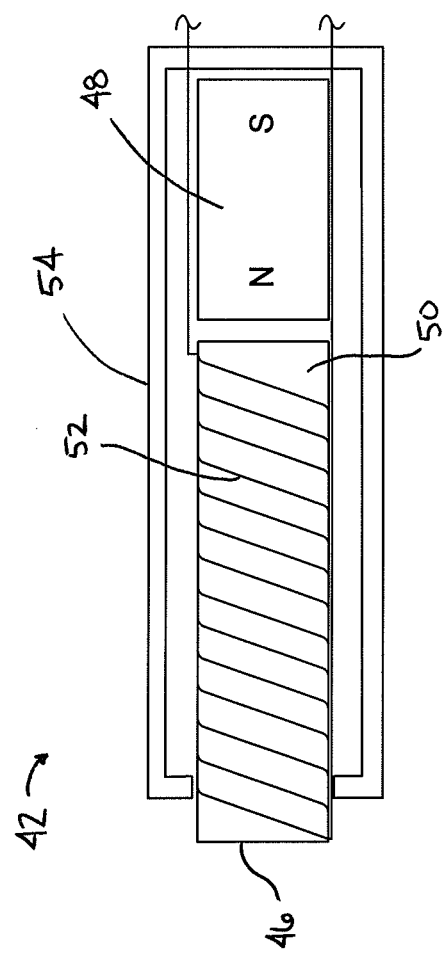
FIG. 3 is a simplified schematic representation of a speed sensor suitable for use with the fluid device of FIG. 1.

Referring now to FIG. 3, a schematic representation of the speed sensor 42 is shown. The speed sensor 42 is a magnetic sensor of the variable reluctance type. An exemplary speed sensor 42 suitable for use in the fluid device 10 is commercially available from Eaton Corporation having a product number designation of A-7462.

The speed sensor 42 includes a permanent magnet 48 aligned with a ferrous rod 50. A wire coil 52 is wrapped around the ferrous rod 50. The speed sensor 42 further includes a sensor housing 54 that encloses the permanent magnet 48 and the wire coil 52. In addition to the permanent magnet 48 and the wire coil 52, the sensor housing 54 encloses all but the end 46 of the ferrous rod 50.

Figure 4:
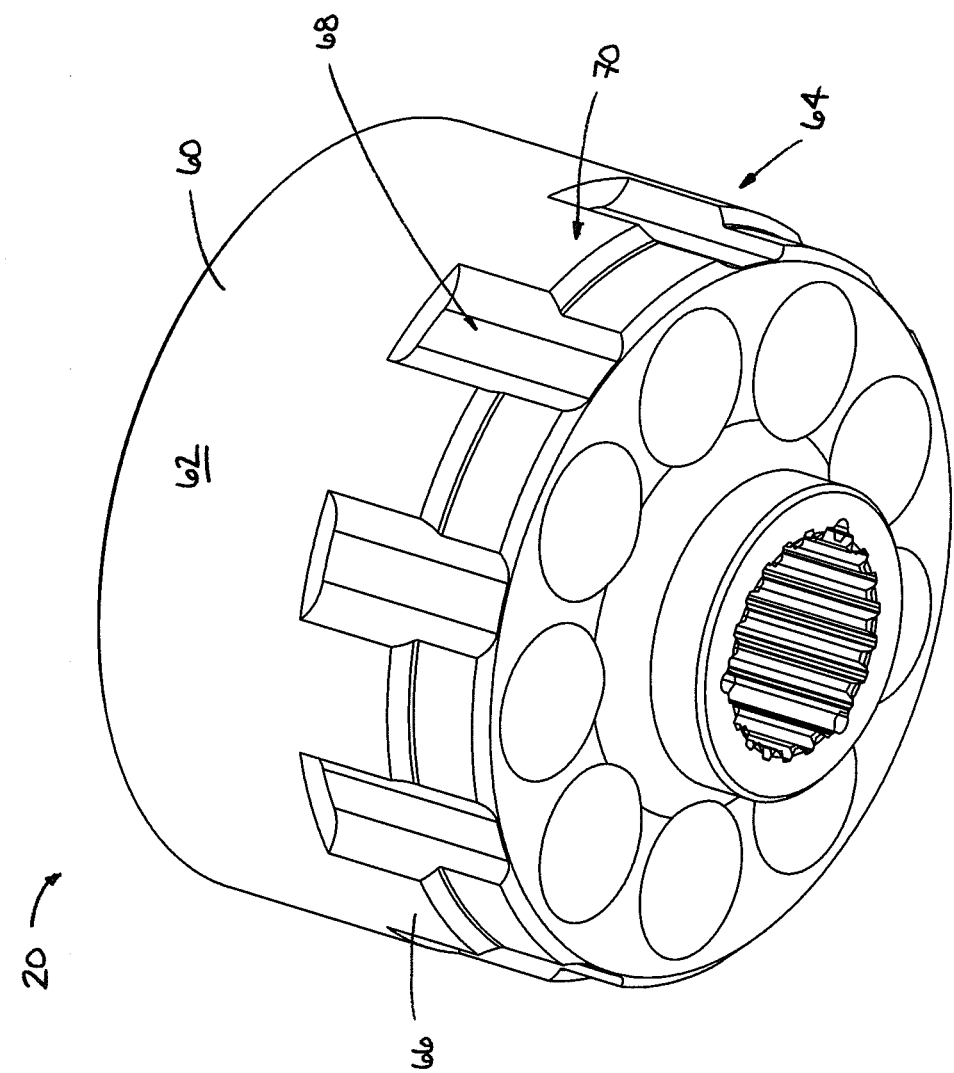
FIG. 4 is an isometric view of a cylinder barrel suitable for use with the fluid device of FIG. 1.
Figure 5:
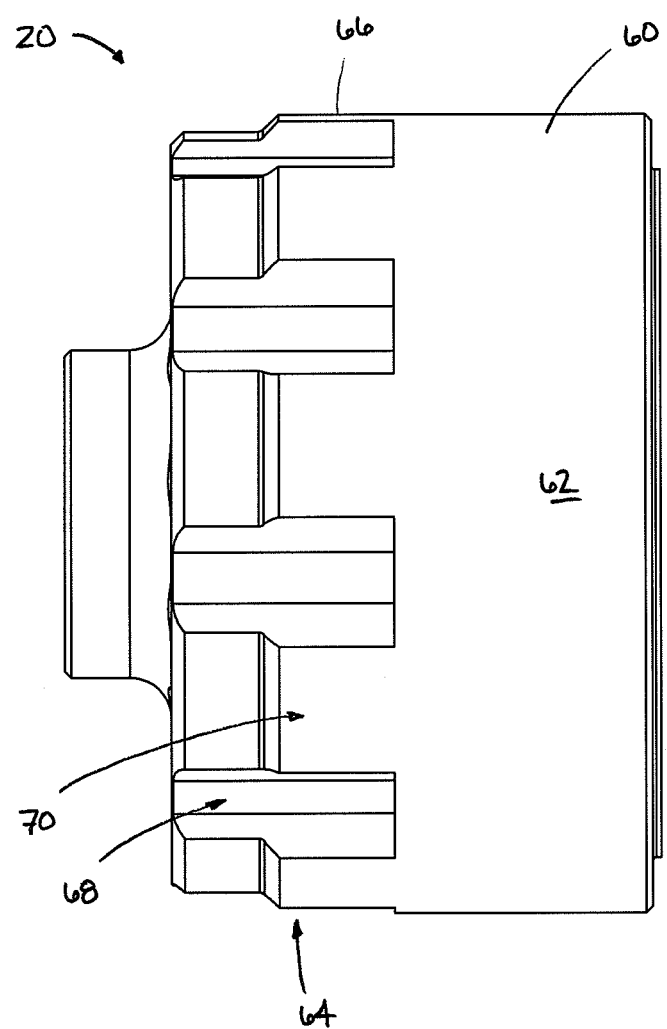
FIG. 5 is a side view of the cylinder barrel of FIG. 4.
Figure 6:
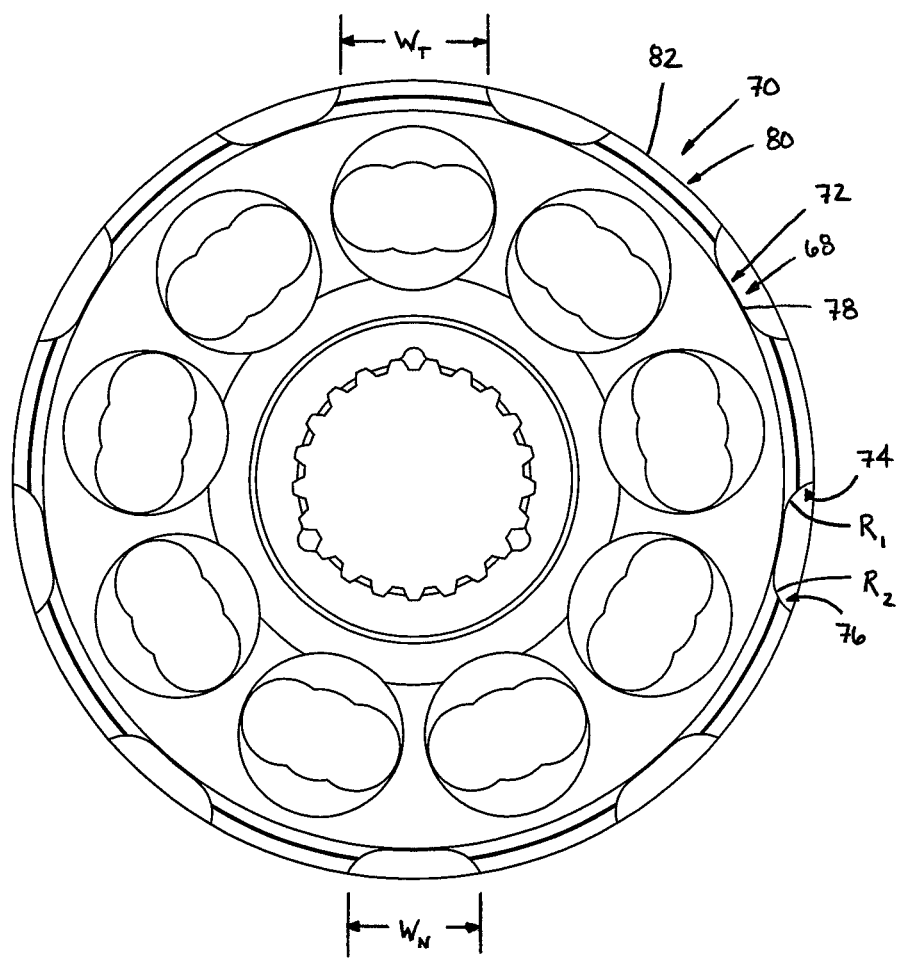
FIG. 6 is a front view of the cylinder barrel of FIG. 4.

Referring now to FIGS. 4-6, the cylinder barrel 20 is shown. The cylinder barrel 20 includes a main body 60 having an outer surface 62. A speed pick-up ring, generally designated 64, is engaged to the cylinder barrel 20. The speed pick-up ring 64 includes a main body 66 defining a plurality of notches, generally designated 68, and having a plurality of targets, generally designated 70. The plurality of notches 68 and the plurality of targets 70 are alternately and adjacently arranged. In the subject embodiment, the main body 66 of the speed pick-up ring 64 is integral with the main body 60 of the cylinder barrel 20. While the speed pick-up ring 64 is shown as being integral with the cylinder barrel 20, it will be understood that the scope of the present disclosure is not limited to the speed pick-up ring 64 being integral with the cylinder barrel 20.

In the subject embodiment, and by way of example only, the cylinder barrel 20 includes nine notches 68. The notches 68 are symmetrically arranged about the cylinder barrel 20. In the subject embodiment, and by way of example only, each successive notch 68 is disposed about 40 degrees from the previous notch 68.

As best shown in FIG. 6, each of the notches 68 includes a base wall, generally designated 72, a first sidewall, generally designated 74, and an oppositely disposed second sidewall, generally designated 76. The base wall 72 includes a generally convex portion 78. In one embodiment, the convex portion 78 defines a center that is generally aligned with the longitudinal axis 36 of the cylinder barrel 20. In this embodiment, the convex portion 78 provides a generally uniform distance between an outer diameter of the outer surface 62 of the cylinder barrel 20 and an outer diameter of the base wall 70. In the subject embodiment, this generally uniform distance is in the range of about 0.05 inches to about 0.5 inches. In another embodiment, this generally uniform distance is in the range of about 0.10 inches to about 0.29 inches. In another embodiment, this generally uniform distance is less than or equal to about 0.3 inches.

The first and second sidewalls 74, 76 define radiuses $R_1$, $R_2$, respectively. In the subject embodiment, the radius $R_1$ is substantially similar to the radius $R_2$. It will be understood, however, that the scope of the present disclosure is not limited to the radius $R_1$ being substantially similar to the radius $R_2$. In the subject embodiment, the radius $R_1$ is in the range of about 0.1 inches to about 0.7 inches. In another embodiment, the radius $R_1$ is in the range of about 0.14 inches to about 0.60 inches. In another embodiment, the radius $R_1$ is greater than or equal to about 0.14 inches. In another embodiment, the radius $R_1$ is greater than or equal to about 0.19 inches.

Each notch 68 defines a notch width $W_N$ that is measured from the interface of the first sidewall 74 and the outer surface 62 to the interface of the second sidewall 76 and the outer surface 62. In the subject embodiment, the width $W_N$ is in the range of about 0.4 inches to about 0.8 inches. In another embodiment, the width $W_N$ is in the range of about 0.5 inches to about 0.7 inches. In another embodiment, the width $W_N$ is less than or equal to about 0.7 inches.

The plurality of targets 70 is disposed on the outer surface 62 adjacent to each notch 68. In the subject embodiment, the targets 70 include a sensing surface 80. In the subject embodiment, the sensing surface 80 includes a generally convex portion 82. In one embodiment, the convex portion 82 defines a center that is generally aligned with the axis of rotation 36 of the cylinder barrel 20. In the subject embodiment, the sensing surface 80 is continuous with the outer surface 62 of the cylinder barrel 20.

Each target 70 defines a target width $W_T$ that is measured from the interface of the second sidewall 76 of an adjacent notch 68 and the outer surface 62 to the interface of the first sidewall 74 of an oppositely adjacent notch 68 and the outer surface 62. In the subject embodiment, the target width $W_T$ is in the range of about 0.4 inches to about 0.8 inches. In another embodiment, the width $W_T$ is in the range of about 0.5 inches to about 0.7 inches. In another embodiment, the target width $W_T$ is less than or equal to about 0.7 inches. In another embodiment, the target width $W_T$ is in the range of about 75% to about 125% of the notch width $W_N$. In another embodiment, the target width $W_T$ is in the range of about 90% to about 110% of the notch width $W_N$. In a preferred embodiment, the target width $W_T$ is approximately equal to the notch width $W_N$.

Referring now to FIGS. 1-6, the speed sensor 42 outputs a voltage when the speed sensor 42 detects changes in the air gap 44. As the cylinder barrel 20 rotates, the air gap 44 increases and decreases. The air gap 44 increases during the transition from the target 70 to the notch 68 and decreases during the transition from the notch 68 to the target 70.

In response to the changes in the air gap 44, the voltage output of the speed sensor increases and decreases. For example, in the subject embodiment, the voltage output of the speed sensor 42 increases when the air gap 44 decreases and decreases when the air gap 44 increases. As the notches 68 and targets 70 are alternately arranged about the cylinder barrel 20, the air gap 44 alternately increases and decreases. This alternating increase and decrease in the air gap 44 results in a generally sinusoidal voltage output.

The voltage output from the speed sensor 42 includes a frequency and amplitude. As the speed of the cylinder barrel 20 increases, the frequency and amplitude of the voltage output increase. For example, if the cylinder barrel 20 rotates at 500 rpm, the amplitude of the voltage output of the speed sensor is about 7 volts. If the rotational speed of the cylinder barrel 20 increases to 3000 rpm, the amplitude of the voltage output increases to 45 volts. Based on the frequency and amplitude of the voltage output, a speed determination is made by a microprocessor.

In addition to changes in the air gap 44, the voltage output of variable reluctance speed sensor 42 changes in response to noise (e.g., system vibration, turbulence, unbalanced rotating group, etc.). As a result of noise, fluctuations in the voltage output of the speed sensor 42 can develop between the peaks of the generally sinusoidal voltage output. If these fluctuations have amplitudes that are greater than a predefined value, the fluctuations can be falsely interpreted as corresponding to changes (i.e., notches 68 and targets 70) in the profile of the rotating group 18. In this scenario, the determination of the frequency of the voltage output will include these fluctuations which will negatively affect the accuracy of the speed determination.

The speed pick-up ring 64 of the present disclosure minimizes or eliminates the fluctuations in the voltage output of the speed sensor 42. In one embodiment, the speed pick-up ring 64 minimizes or eliminates the fluctuations in voltage output of the speed sensor 42 by providing a first air gap that is generally constant when the speed sensor 42 is disposed above the targets 70 and a second air gap that is generally constant when the speed sensor 42 is disposed above the notches 68. While the first air gap is less than the second air gap, the general constancy of the first air gap and the general constancy of the second air gap prevent or eliminate changes in the voltage output as the targets 70 and notches 68 are sensed by the speed sensor 42.

In another embodiment, the speed pick-up ring 64 minimizes or eliminates the fluctuations in the voltage output of the speed sensor 42 by providing consistent first and second air gaps and by providing notch widths $W_N$ that are about equal to target widths $W_T$.

Figure 7:
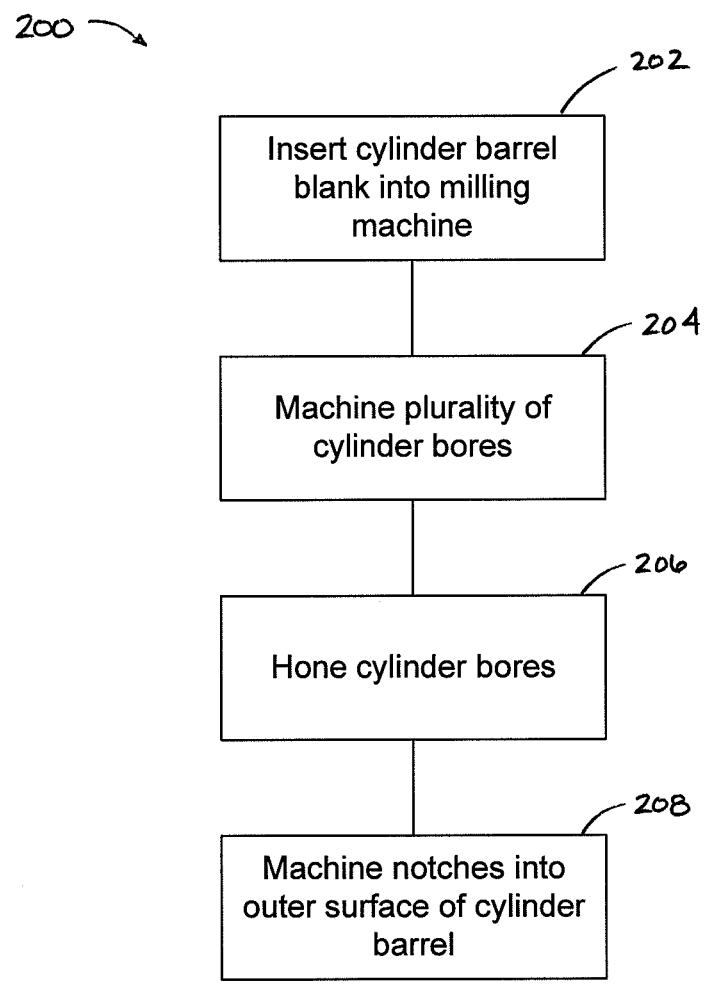
FIG. 7 is a representation of a method for manufacturing a cylinder barrel suitable for use in the fluid device of FIG. 1.

Referring now to FIG. 7, a method 200 for manufacturing the cylinder barrel 20 will be described. In step 202, a cylinder barrel blank is inserted into a chuck of a milling machine. In one embodiment, the outer diameter of the cylinder barrel blank has been previously machined prior to inserting the cylinder barrel blank into the milling machine. In another embodiment, the outer diameter of the cylinder barrel blank is machined in the milling machine.

The cylinder bores 22 are then machined in step 204 using a cutting tool. In one embodiment, the milling machine includes multiple cutting tools for machining multiple cylinder bores 22 at one time. For example, in the subject embodiment, in which nine cylinder bores 22 are to be machined, three cylinder bores 22, with each cylinder bore 22 being about 120 degrees apart from the adjacent cylinder bore 22, are machined at one time. In this embodiment, the cutting tools are then indexed in increments of 40 degrees until all of the cylinder bores 22 have been machined. In step 206, the cylinder bores 22 are honed.

With the cylinder bores 22 machined and honed, each of the notches 66 are milled into the outer surface 62 of the cylinder barrel block. In the subject embodiment, each notch 68 is sequentially milled into the outer surface 62. The notches 68 are machined such that the base wall 72 of each notch 68 includes the generally convex portion 78. In one embodiment, the notches 68 are machined such that each notch 68 is disposed between adjacent cylinder bores 22. This arrangement is potentially advantageous as it prevents the wall thickness of the cylinder bore 22 from being too thin.

The ability to machine the cylinder bores 22 and the notches 68 on the same machine is potentially advantageous as it allows for a more accurate alignment between the center of the convex portion 78 of the base wall 72 of the notches 68 and the axis of rotation 36 of the cylinder barrel 20. More accurate alignment can be achieved since the cylinder barrel 20 does not have to be removed from the milling machine and inserted into another machine. In addition, the ability to machine the cylinder bores 22 and the notches 68 on the same machine reduces machining time since the cylinder barrel 20 does not need to be transferred and inserted into another machine.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A speed pick-up ring for use with a variable reluctance speed sensor, the speed sensor arranged proximate a rotating group, the speed pick-up ring comprising:
    a main body including a plurality of targets;
    a plurality of notches, each notch being disposed between adjacent targets, each notch including a base wall, a first sidewall and an oppositely disposed second sidewall, wherein the base wall includes a convex portion,
    wherein the rotating group includes a cylinder barrel defining a plurality of axially oriented cylinder bores and a plurality of axially reciprocal pistons disposed in the cylinder bores, and
    wherein the speed pick-up ring is coupled to the cylinder barrel.

2. A speed pick-up ring as claimed in claim 1, wherein the convex portion of the base wall defines a center that is generally aligned with a longitudinal axis of the main body.

3. A speed pick-up ring as claimed in claim 2, wherein a generally uniform distance is formed between an outer surface of the main body and an outer diameter of the convex portion, the generally uniform distance being in a range of about 0.05 inches to about 0.5 inches.

4. A speed pick-up ring as claimed in claim 3, wherein the generally uniform distance is in a range of about 0.1 inches to about 0.29 inches.

5. A speed pick-up ring as claimed in claim 1, wherein the first sidewall defines a first radius and the second sidewall defines a second radius.

6. A speed pick-up ring as claimed in claim 1, wherein each of the first and second radiuses is in a range of about 0.1 inches to about 0.7 inches.

7. A speed pick-up ring as claimed in claim 6, wherein each of the first and second radiuses is in a range of about 0.14 inches to about 0.6 inches.

8. A speed pick-up ring as claimed in claim 1, wherein each of the plurality of targets includes a sensing surface that includes a convex portion.

9. A speed pick-up ring as claimed in claim 8, wherein the convex portion of the sensing surface defines a center that is generally aligned with a longitudinal axis of the main body.

10. A speed pick-up ring as claimed in claim 8, wherein a width of the target is about equal to a width of the notch.

11. An fluid device comprising:
    a housing;
    a variable reluctance speed sensor engaged with the housing;
    a rotating group having a cylinder barrel defining a plurality of axially oriented cylinder bores and a plurality of axially reciprocal pistons disposed in the cylinder bores; and
    a speed pick-up ring disposed within the housing, the speed pick-up ring including:
        a main body including a plurality of targets; and
        a plurality of notches, each notch being disposed between adjacent targets, each notch including a base wall, a first sidewall defining a first radius and an oppositely disposed second sidewall defining a second radius, wherein the base wall includes a convex portion.

12. A fluid device as claimed in claim 11, wherein the speed pick-up ring is integral with the cylinder barrel.

13. A fluid device as claimed in claim 11, wherein the convex portion of the base wall defines a center that is generally aligned with a longitudinal axis of the main body.

14. A speed pick-up ring as claimed in claim 13, wherein a generally uniform distance is formed between an outer surface of the main body and an outer diameter of the convex portion, the generally uniform distance being in a range of about 0.10 inches to about 0.29 inches.

15. A fluid device as claimed in claim 13, wherein each of the plurality of targets includes a sensing surface that includes a convex portion.

16. A fluid device as claimed in claim 15, wherein the convex portion of the sensing surface defines a center that is generally aligned with a longitudinal axis of the main body.

17. A fluid device as claimed in claim 16, wherein a width of the target is about equal to a width of the notch.

18. A method of manufacturing a cylinder barrel having an integral speed pick-up ring, the method comprising:
    machining a plurality of axially oriented cylinder bores; and
    machining a plurality of notches in an outer surface of the cylinder barrel, wherein the each of the plurality notches is machined such that a base wall of each notch includes a convex portion.

19. A method of manufacturing a cylinder barrel having an integral speed pick-up ring as claimed in claim 18, wherein each notch includes a first sidewall defining a first radius and an oppositely disposed second sidewall defining a second radius.

* * * * *